US010483726B1

(12) United States Patent
Seff et al.

(10) Patent No.: US 10,483,726 B1
(45) Date of Patent: Nov. 19, 2019

(54) POWER PEDESTAL WITH SKELETON TOWER ASSEMBLY AND COOPERATING OUTER SLEEVE AND RELATED METHODS

(71) Applicant: Eaton Intelligent Power Limited, Dublin (IE)

(72) Inventors: Paul D. Seff, Williamsburg, VA (US); Tyler D. Young, Yorktown, VA (US); Jeffery Kuykendall, Williamsburg, VA (US); Jason D. Easton, Williamsburg, VA (US); Cory Robert Weeks, Hampton, VA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/299,760

(22) Filed: Mar. 12, 2019

(51) Int. Cl.
| | |
|---|---|
| *H02B 1/50* | (2006.01) |
| *H02B 1/26* | (2006.01) |
| *E04H 5/06* | (2006.01) |
| *B60L 53/31* | (2019.01) |
| *H02B 1/04* | (2006.01) |

(52) U.S. Cl.
CPC .............. *H02B 1/50* (2013.01); *B60L 53/31* (2019.02); *E04H 5/06* (2013.01); *H02B 1/04* (2013.01); *H02B 1/26* (2013.01)

(58) Field of Classification Search
CPC ....................................................... H02B 1/50
See application file for complete search history.

(56) References Cited

U.S. PATENT DOCUMENTS

| | | | | |
|---|---|---|---|---|
| 4,785,376 A | * | 11/1988 | Dively ..................... | H02B 1/50 137/356 |
| 4,951,182 A | * | 8/1990 | Simonson ............... | F21S 8/081 312/100 |
| 5,134,541 A | * | 7/1992 | Frouin ..................... | H02B 1/50 137/356 |
| 6,844,716 B1 | | 1/2005 | Lundberg et al. | |
| 7,570,481 B2 | * | 8/2009 | Seff ......................... | H02B 1/50 174/541 |
| 7,614,143 B2 | * | 11/2009 | Seff ......................... | E01F 9/617 29/831 |
| 8,089,747 B2 | | 1/2012 | Storck et al. | |
| 9,983,615 B2 | * | 5/2018 | Drueke .................... | G05F 5/00 |
| 9,991,689 B2 | * | 6/2018 | Drueke ................. | F16M 13/02 |
| 10,158,221 B2 | * | 12/2018 | Seff ......................... | H02B 1/50 |
| 2008/0253061 A1 | * | 10/2008 | Seff ......................... | H02B 1/50 361/622 |
| 2017/0169685 A1 | * | 6/2017 | Easton ..................... | H02H 3/04 |

(Continued)

OTHER PUBLICATIONS

Eaton Corporation "Marina Power and Lighting Solutions" Website overview of products & services, https://www.eaton.com/Eaton/ProductsServices/Electrical/ProductsandServices/ElectricalDistribution/SpecialtyPowerDistributionSystems/MarinaPowerandLightingSolutions/index.htm (1 page) (date unknown, but prior to filing date of the present application).

(Continued)

*Primary Examiner* — Robert J Hoffberg
(74) *Attorney, Agent, or Firm* — Myers Bigel, P.A.

(57) ABSTRACT

Power pedestals configured with a skeleton tower assembly that has a skeleton tower frame that supports electronic components and a first wall panel with a plurality of external power receptacles and an outer sleeve coupled to the skeleton tower frame to avoid the use of doors and provide an efficient assembly process.

21 Claims, 7 Drawing Sheets

(56) References Cited

U.S. PATENT DOCUMENTS

2017/0179691 A1* 6/2017 Easton .................... H02B 1/50
2017/0237251 A1   8/2017 Easton et al.

OTHER PUBLICATIONS

Eaton Corporation "Marina Power and Lighting" Capabilities Brochure (6 pages) (2015).
Marina Electrical Equipment, Inc. Product Categories, https://marinaee.com/ (9 pages) (date unknown, but prior to filing date of the present application).
Marina Electrical Equipment, Inc. Product Brochure (20 pages) (date unknown, but prior to filing date of the present application).

* cited by examiner

POWER PEDESTAL WITH SKELETON TOWER ASSEMBLY AND COOPERATING OUTER SLEEVE AND RELATED METHODS

FIELD OF THE INVENTION

The present invention relates to power pedestals and may be particularly suitable for marine or recreational vehicle power pedestals.

BACKGROUND

Power pedestals are typically free-standing outdoor electrical enclosures and are well known in the art. See, e.g., U.S. Pat. Nos. 8,089,747 and 6,844,716, the contents of which are hereby incorporated by reference as if recited in full herein. The power pedestals can provide a utility power distribution for certain target devices such as marine or recreational vehicles. Known power pedestals include one or more circuit breakers and power receptacles that can be used to provide power to the target devices. The power pedestals include one or more circuit interrupters breakers such as ground fault circuit interrupters (GFCIs) that provide ground fault protection for the power receptacles.

SUMMARY OF EMBODIMENTS OF THE INVENTION

Embodiments of the invention are directed to power pedestals that include a skeleton tower assembly comprising a skeleton tower frame that supports a first wall panel with a plurality of external power receptacles and an outer sleeve coupled to the skeleton tower frame.

The outer sleeve can have a pair of parallel vertically oriented fold lines that define a first outer wall segment adjacent a back of the power pedestal.

The power pedestal can have a substantially triangular shape with three primary sides. The three primary sides can include two opposing sidewalls and a back wall, with at least the sidewalls having a substantially common length. The first outer wall segment can reside between a respective sidewall and the back wall and can have a length that is in a range of about 10-30% that of the two opposing sidewalls.

The power pedestal can further include: a second wall panel coupled to the skeleton tower frame that, resides below the first wall panel that angles downward as it extends forward toward a front of the power pedestal; and a third wall panel coupled to the skeleton tower frame that is vertically oriented and resides under the second wall panel. The power pedestal can also further include a breaker handle cover and a circuit breaker coupled to the skeleton tower frame. The outer sleeve can have apertures that define access windows for the breaker handle cover and a switch of the circuit breaker.

The outer sleeve can be doorless.

The first wall panel can reside at an angle from vertical that is between 10 and 30 degrees.

The outer sleeve and skeleton tower assembly can define an enclosure. The outer sleeve can provide a front wall segment of an upper portion of the enclosure and the skeleton tower assembly can provide a front wall segment of a lower portion of the enclosure. The first wall panel with the plurality of external power receptacles can reside between the front wall segments of the upper and lower portions of the enclosure. The front wall segment of the lower portion of the enclosure can have a greater height than the front wall segment of the upper portion of the enclosure.

The front wall segment of the upper portion of the enclosure can be vertically spaced apart from and aligned with the front wall segment of the lower portion of the enclosure with the front wall segment. Each of the front wall segments can be planar.

The outer sleeve can be provided by a cooperating pair of foldable planar sheets of outer sleeve material that are each coupled to the skeleton tower frame. The front wall segment of the upper portion of the enclosure can be defined by adjacent or abutting edges of the foldable planar sheets.

The outer sleeve can be provided by a single unitary body of a foldable planar sheet of outer sleeve material that is coupled to the skeleton tower frame. A front wall segment of the upper portion of the enclosure can be defined by adjacent or abutting edges of the foldable planar sheet.

The first wall panel can have a flange on a perimeter thereof. A segment of the outer sleeve can couple to the flange.

The power pedestal can also include a load center held by the skeleton tower frame inside the outer sleeve and above the first wall panel and a circuit breaker held by the skeleton tower frame inside the outer sleeve.

The skeleton tower frame can have a base with a perimeter that defines upwardly extending back legs. The base can attach to a front lower panel of the power pedestal and an interior panel of the power pedestal. A water box can be provided between the front lower panel and the interior panel. The outer sleeve can have apertures that receive fixation members that couple the outer sleeve to the upwardly extending back legs of the skeleton tower frame.

The outer sleeve can have an access window in a first wall segment that resides over a breaker held by the skeleton tower frame. The breaker can reside under the first wall segment of the outer sleeve. The first wall segment can be a minor wall segment that resides between a back wall and a first sidewall defined by the outer sleeve. The first wall segment can have a length that is less than the first sidewall.

The power pedestal can also include a top cover attached to the skeleton tower frame. The top cover can have a substantially triangular shape.

The power pedestal can further include a breaker handle flip cover held by the skeleton tower frame and extending through an aperture in the outer sleeve.

The outer sleeve can terminate adjacent an outer perimeter portion of the first wall panel with the power receptacles. The power pedestal can also include a second wall panel that resides under the first wall panel and tapers down in a direction toward the front of the enclosure away from the first wall panel.

The power pedestal can have a light source coupled to the skeleton tower frame above the first wall panel that is configured to illuminate downward toward the power receptacles.

Other embodiments are directed to methods of assembling a power pedestal. The methods include: providing a skeleton tower frame with a base having upwardly extending spaced apart rear legs; coupling power receptacles, a circuit breaker and a load center to the skeleton power frame; and attaching an outer sleeve to the skeleton tower frame to define an enclosure that encloses the circuit breaker and the load center and exposes the power receptacles.

The outer sleeve can be folded from a planar shape to define three primary sides including a back wall and first and second opposing sidewalls of the enclosure, wherein the a plurality of the three primary sides can have a substantially common length and/or height.

The outer sleeve can be doorless and wherein the outer sleeve can have apertures that expose a breaker handle cover and a switch of the circuit breaker.

The outer sleeve can be selected from first and second outer sleeves of different materials and a common size and shape.

The outer sleeve can be provided by cooperating first and second outer sleeve members.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly. The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers and trailers.

As employed herein, the term "marine vehicle" shall expressly include, but not be limited by, any water-based vehicles, ships, boats, personal water craft or other vessels for travel on water, submarines, or other vessels for travel under water.

As employed herein, the term "air vehicle" shall expressly include, but not be limited by, any air-based vehicles, airplanes, jets, aircraft, airships, drones, balloons, blimps, or dirigibles.

As employed herein, the term "power pedestal" shall mean a pedestal structured to input power from input power terminals (e.g., utility power terminals) and output power to a number of output power receptacles held by the power pedestal.

Referring to FIGS. 1-4, a power pedestal 10 such as, for example and without limitation, a marine and/or vehicle power pedestal, includes a skeleton tower assembly 20 coupled to an outer sleeve 30 that together define an enclosure 10e for certain electrical components of the power pedestal 10. The power pedestal 10 can also include a plurality of output power receptacles 40 that are externally accessible. The power receptacles 40 can be held by a first wall panel 23 of the skeleton tower assembly 20. The first wall panel 23 can reside between upper 10u and lower 10l portions of the power pedestal 10 so as to be medially located. The first wall panel 23 can face a front 10f of the power pedestal 10. The front 10f of the power pedestal 10 can be oriented to face any desired in-use direction.

As will be discussed further below, the outer sleeve 30 can be provided as at least one planar sheet 30p that is foldable or otherwise formable into an assembly shape to attach to the skeleton tower assembly 20. In some embodiments, the outer sleeve 30 is provided as a pair of cooperating foldable or folded planar sheets $30p_1$, $30p_2$ (FIG. 3) that can each couple to the skeleton tower assembly 20 and form opposing sides and part of the front and rear of the enclosure 10e. A front wall segment $11_1$ of the upper portion 10u of the enclosure 10e can be defined by adjacent, typically abutting, edges of the foldable planar sheets. In some embodiments, the outer sleeve 30 is provided by a single unitary body of a foldable planar sheet of outer sleeve material. A front wall segment $11_1$ of the upper portion 10u of the enclosure 10e can be defined by adjacent, typically abutting, edges of the foldable planar sheet.

The power pedestal 10 can also include a second wall panel 22 that neighbors the first wall panel 23 and resides under the first wall panel 23 with the power receptacles 40. The power pedestal 10 can also include a third wall panel 21 that resides under the second wall panel 22 and can be vertically oriented to define a front wall segment $11_2$ at the lower portion 10l of the front 10f of enclosure 10e. The second wall panel 22 can taper down as it extends toward the third wall panel 21. The second wall panel 22 can extend at an angle "α" from the first wall panel 23. The angle α can be between 40-90 degrees. The first, second and third wall, panels 23, 22 and 21 can all be part of the skeleton tower assembly 20 (FIG. 5) rather than the outer sleeve 30.

Figure 4:
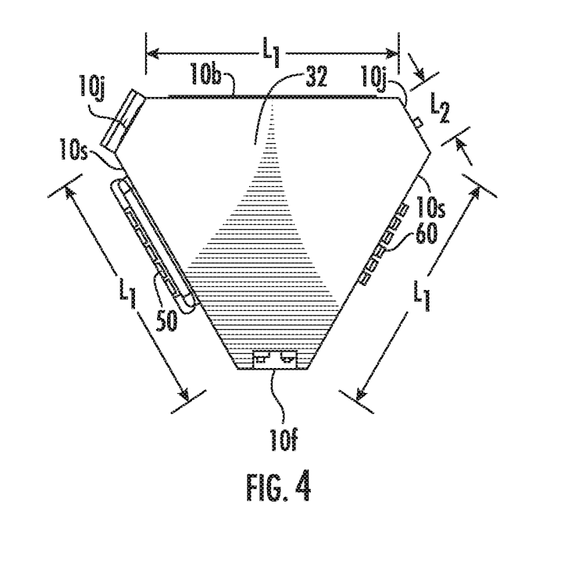
FIG. 4 is a top view of the power pedestal shown in FIG. 1.

Referring to FIG. 4, the power pedestal 10 can have a substantially triangular shape with three primary sides of substantially the same length "$L_1$" (meaning that the lengths are within about 20% of the same length) or the same length, i.e., two opposing sidewalls 10s and a back wall 10b. The term "substantially triangular" means that lines extended from adjacent primary sides of the enclosure 10e intersect. A minor outer wall segment 10j can extend between vertically extending fold lines 14 (FIG. 8) and, in position, can reside between a respective sidewall 10s and the back wall 10b and can have a length $L_2$ that is in a range of about 10-30% that of the two opposing sidewalls 10s and the back wall 10b.

The front wall segments $11_1$, $11_2$ of the front 10f of the enclosure 10e can form a minor side of the enclosure 10e of the power pedestal 10 and can have a lateral extent that is in a range of about 20% to about 50% the length $L_1$ of the other sides and back 10s, 10b of the enclosure 10e.

Figure 6:
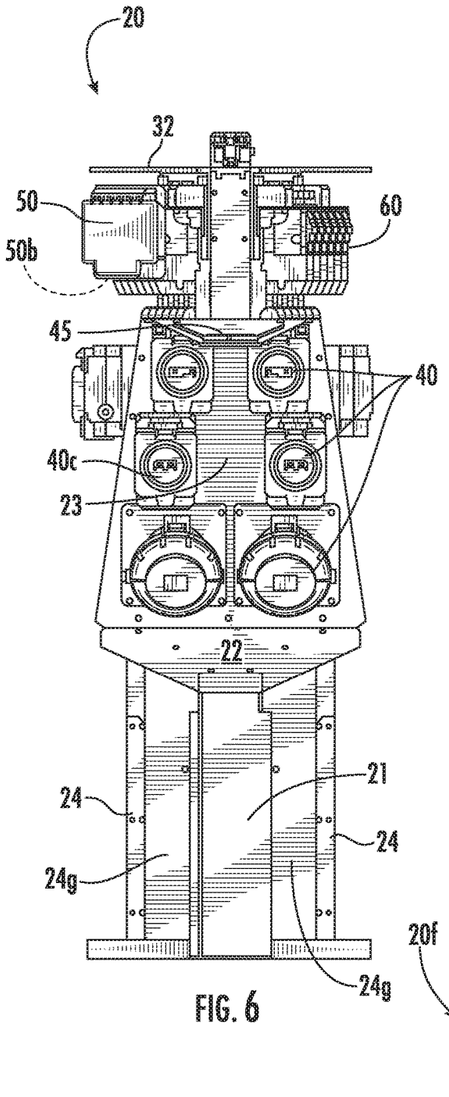
FIG. 6 is a front view of the skeleton tower assembly shown in FIG. 5.

Current power pedestals employ an outer housing with hinged doors to cover breakers under same. In some embodiments, the power pedestal 10 is doorless (devoid of any rectangular shaped hinged doors) and does not include any doors or covers mounted to the outer sleeve 30. Instead, the power pedestal 10 can be configured with individual covers 40c for each receptacle 40 and a cover 50 for a house breaker 50b (FIG. 6). The covers 40c, 50 can be flip covers or other suitable covers.

Still referring to FIGS. 1-4, the power pedestal 10 can also include a water box 15. The water box 15 can reside behind the third (front) wall panel 21 and can provide a water supply line valve connection.

The power pedestal 10 can also include at least one circuit breaker 35 (optionally above 50 A such as a 100 A rated breaker), a breaker handle flip cover 50, and a load center 60 such as a CH or BR type plug-on load center. The load center 60 can be configured as a plug-on back pan and the power pedestal does not require feed through wired breakers. See, e.g., co-pending U.S. patent application Ser. No. 15/840, 360, entitled, LOAD CENTERS WITH NEUTRAL BUS BARS FOR BREAKER PLUG-ON NEUTRAL CONNECTIONS, the contents of which are hereby incorporated by reference as if recited in full herein.

The power pedestal 10 can include a top cover 32. The power pedestal 10 can include an outer wall 10w that is defined at least in part by the outer sleeve 30. The outer sidewalls 10s can be defined by panel segments 144 of the outer sleeve 30. The power pedestal 10 can have a front wall panel 21 that provides a nose of the enclosure 10e. The front wall panel 21 can be a front most surface of the enclosure 10e that is under the first wall panel 23 that holds at least some of the power receptacles 40.

Figure 2:
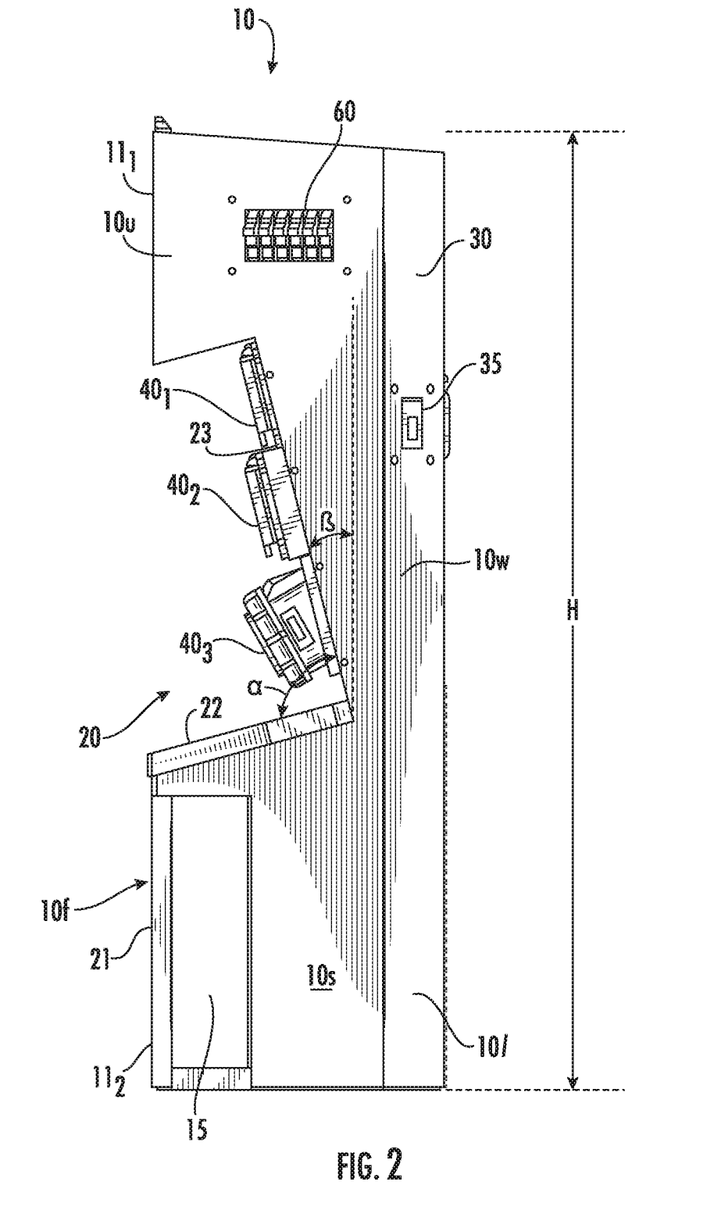
FIG. 2 is a side view of the power pedestal shown in FIG. 1.
Figure 3:
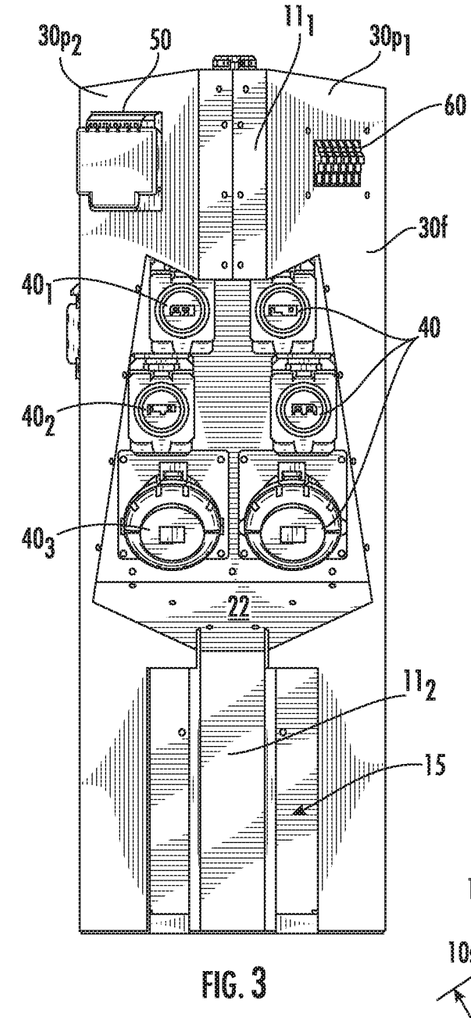
FIG. 3 is a front view of the power pedestal shown in FIG. 1.

As shown in FIG. 2, the first wall panel 23 can have an angle of inclination β, measured from vertical that is in a range of 10-40 degrees, more typically 10-30 or 15-30 degrees.

The power receptacles 40 can be marine grade, corrosion resistant receptacles. The power receptacles 40 may include covers 40c. The power pedestal 10 is structured to provide electrical power to devices that are electrically connected to the power pedestal 10 via the output power receptacles 40. The power receptacles 40 can be provided with at least some having different current ratings than others, shown as in three different ratings $40_1$, $40_2$, $40_3$ (FIG. 2) with corresponding different size receptacles, optionally with 30 A, 50 A and 100 A ratings. The power receptacles 40 can be provided in aligned pairs of power receptacles with the same current rating, with the largest rated power receptacles having the largest receptacle size located at a lower portion of the wall panel 23 and the smallest rated at the top of the wall panel 23.

Figure 1:
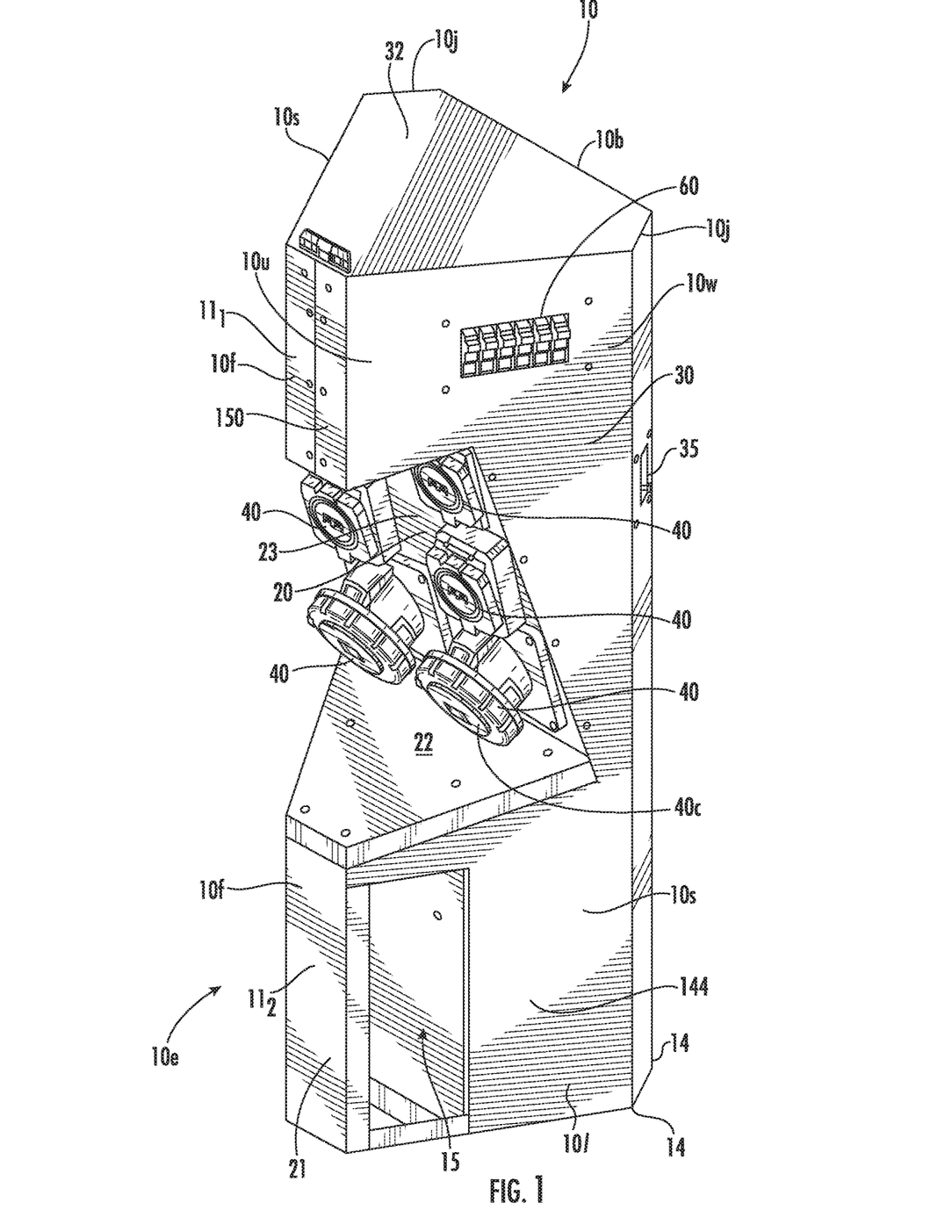
FIG. 1 is a front, side perspective view of an example power pedestal according to embodiments of the present invention.

As shown in FIG. 1, the power pedestal 10 can have an enclosure with two opposing primary sidewalls 10s that taper from a back wall 10b having a first lateral extent or width to the front 10f having a lesser lateral extent at both the upper 10u and lower 10l portions of the power pedestal 10. The front wall segments $11_1$, $11_2$ can have a lateral extent that is between 10-50% of the lateral extent of the back wall 10b, in some embodiments.

Referring to FIG. 1, and as will be discussed further below, the outer sleeve 30 can be provided by a planar sheet of any suitable grade metal, i.e., 316L stainless steel that can be folded or otherwise formed to define an outer wall shape for the enclosure 10e. Wall segments 10j defined by the outer sleeve 30 can have parallel, vertically oriented fold lines 14 (see also FIG. 8) and can reside between the sidewalls 10s and with the back wall 10b.

The front wall segments $11_1$, $11_2$, of the enclosure 10e can be vertically oriented and planar and reside on opposing sides of the first wall panel 23 with the power receptacles 40. The front wall segment $11_1$ of the enclosure 10e at the upper portion 10u of the power pedestal 10 can be provided by the outer sleeve 30 which defines a front 30f (FIGS. 3, 8) and that is affixed to the skeleton tower assembly 20. The front wall segment $11_2$ of the enclosure 10e at the bottom, portion of the power pedestal 10 ran be provide by a front 20f (FIG. 5 of the skeleton tower assembly 20, typically defined by the third wall panel 21.

Figure 7:
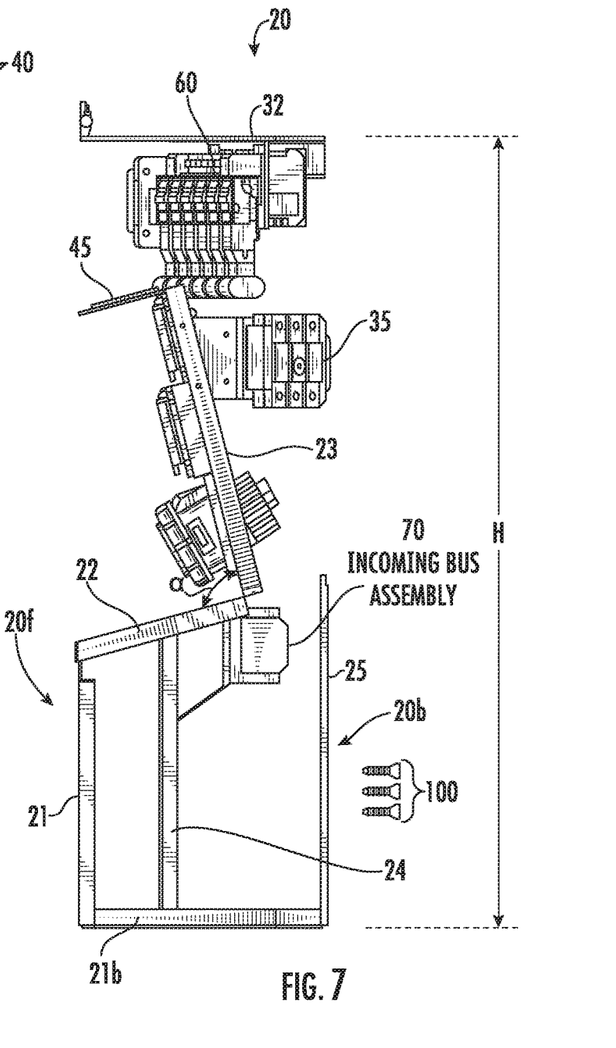
FIG. 7 is a side view of the skeleton tower assembly shown in FIG. 5.

The outer sleeve 30 can define outer sidewalls 10s and a back wall 10b of the enclosure and can extend a length H of the skeleton tower assembly 20 from a top thereof to a bottom thereof (FIGS. 2, 7).

Figure 5:
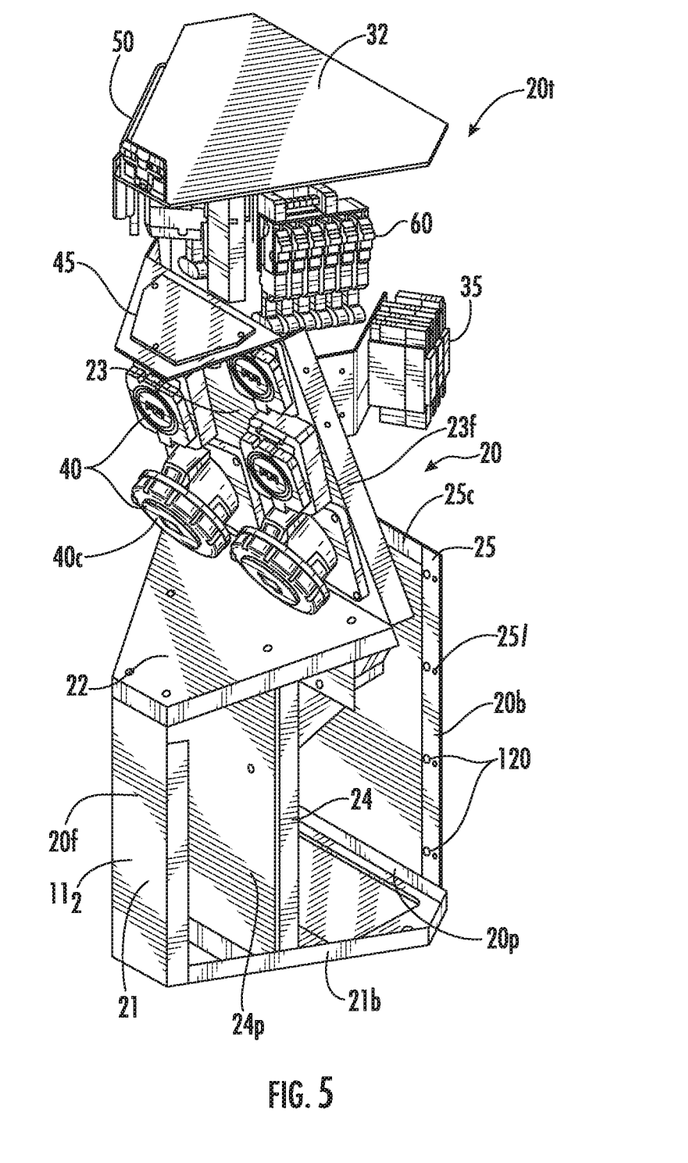
FIG. 5 is a front, side perspective view of a skeleton tower assembly of the power pedestal shown in FIG. 1 (shown with the cooperating outer sleeve removed) according to embodiments of the present invention.

Turning now to FIGS. 5-7, an example skeleton tower assembly 20 is shown. The skeleton tower assembly 20 includes a skeleton tower frame 20t and assembled components such as the power receptacles 40, breaker handle flip cover 50, loadcenter 60 (i.e., providing meters) and an incoming bus assembly 70. The skeleton tower frame 20t can provide a standardized skeleton support structure that can be populated with components then enclosed or coupled to an outer sleeve 30 to provide a commercial, aesthetic product to accelerate and standardize the assembly process. The outer sleeve 30 can be provided in different material options and/or wraps or aesthetic design options including logos, colors and the like, for customized or selectable build options while streamlining the assembly process with standardized builds.

Referring to FIG. 5, the skeleton tower frame 20t can also hold the top cover 32 as well as the first wall panel 23, the second wall panel 22 and the third wall 21. The third wall panel 21 can attach to a base frame segment 21b of the skeleton tower frame 20t that extends in a front to back direction and in a lateral direction about a bottom perimeter 20p of the skeleton tower frame 20t.

As shown in FIGS. 5-7, the skeleton tower assembly 20 can also include a light source 45 that resides in the enclosure 10e coupled to the first wall panel 23 of the skeleton tower assembly 20 to reside above and be able to illuminate the power receptacles 40. In some example embodiments, the power pedestal 10 further includes a photocell (not shown). The photocell can provide ambient light detection which can be used to turn off lights on the power pedestal 10 when it is light outside in order to save power.

The skeleton tower frame 20t can include right and left side upwardly extending frame segments 24 spaced rearward of and on opposing sides of the third wall panel 21, with a gap or open interior space 24g therebetween and that terminate under the second wall panel 22. The frame segments 24 can be joined by an interior panel 24p as shown in FIG. 5.

The skeleton tower frame 20t can include a back 20b with a back wall frame segment 25 that has upwardly extending legs 25l and a cross-frame segment 25c connecting the legs 25l. The upwardly extending legs 25l can have a height that is about the same, typically greater than, the right and left side frame segments 24.

Figure 8:
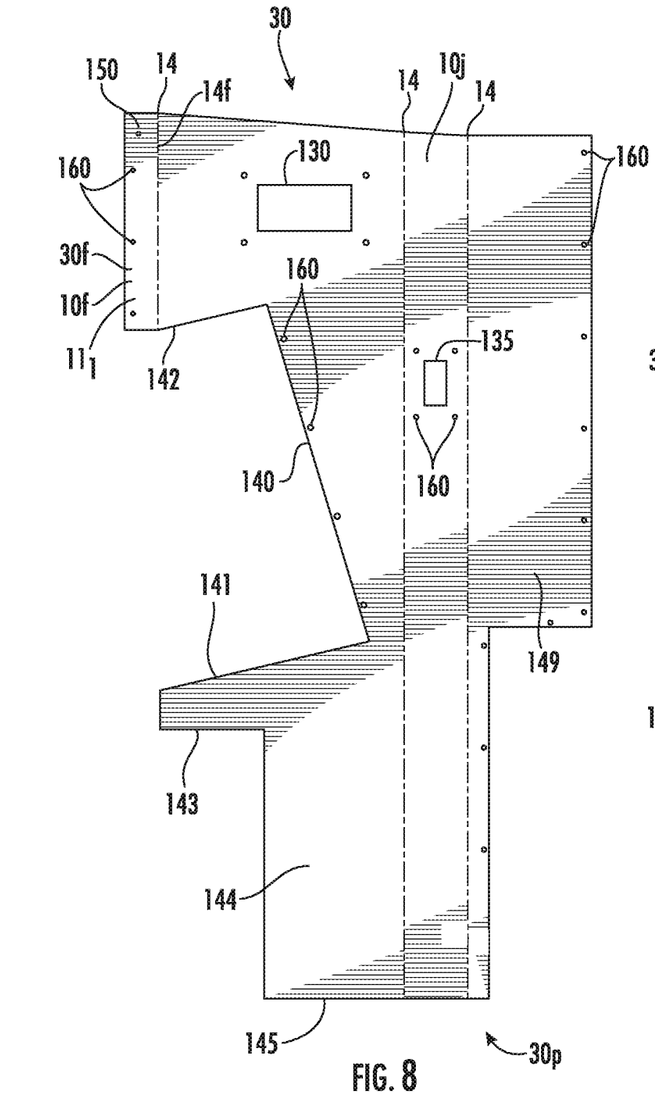
FIG. 8 is a side view of an example outer sleeve of the power pedestal shown in FIG. 1 according to embodiments of the present invention, shown in a first pre-formed configuration.
Figure 9:
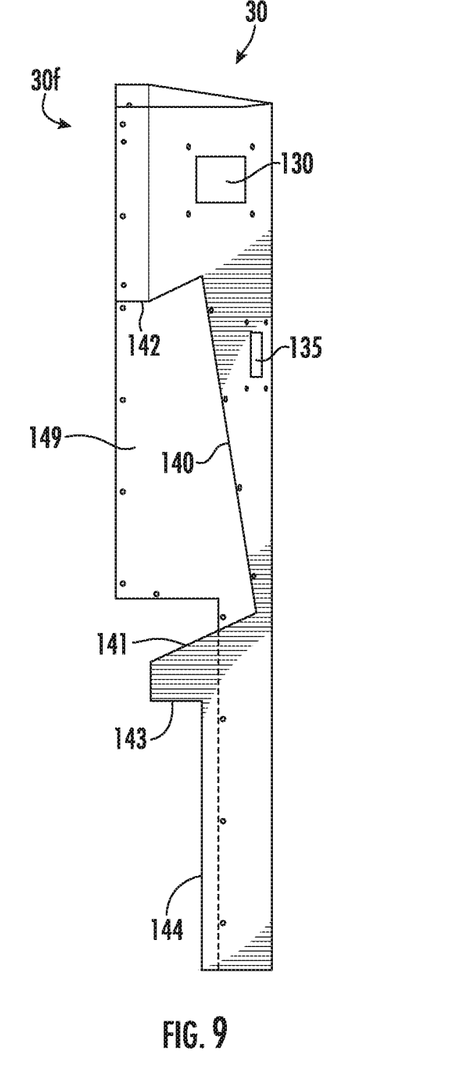
FIG. 9 is a side view of the example outer sleeve shown in FIG. 8 but shown in a second final assembly configuration when coupled to the skeleton tower assembly shown in FIG. 5 according to embodiments of the present invention.

Referring now to FIGS. 8 and 9, the outer sleeve 30 can be provided as a planar sheet 30p (FIG. 8) with vertically oriented fold lines 14, shown as first, second and third spaced apart fold lines 14. The outer sleeve 30 can also include a plurality of spaced apart apertures 160 for receiving attachment members 100 (FIG. 7) to couple the outer sleeve 30 to apertures 120 (FIG. 5) in the skeleton tower assembly 20. One of the fold lines 14, the front fold line that is closest to a front 10f of the enclosure 10e, shown as fold line 14f, can be much shorter (i.e., less than 50% a length, such as 10%-50% the length) of either one of the pair of fold lines 14 forming panel 10j adjacent the rear panel 149 that forms a back wall 10b of the enclosure 10e (FIG. 1). The front fold line 14f can reside adjacent a front panel segment 150 that resides at an upper portion of the enclosure 10u (FIG. 1).

The planar sheet 30p can also comprise an aperture 130 for forming a window for access to the loadcenter 60 and an aperture 135 for access to a switch of the breaker 35. The outer sleeve 30 can include a tapered front facing wall segment 140 that merges into a tapered upper and lower wall segments 142, 141 that extend about the wall panel 23 of the skeleton tower assembly 20 (FIG. 1). The wall segment 140 can include apertures 160 for attaching to a flange 23f of the skeleton tower assembly 20 (FIG. 5).

The planar sheet 30p can also include a horizontal segment 143 under the tapered segment 141 that extends to a lower sidewall segment 144 with a bottom 145.

The planar sheet 30p can be provided as a pair of cooperating foldable or folded planar sheets $30p_1$, $30p_2$ (FIG. 3) that can each couple to the skeleton tower assembly 20 and form opposing sides and part of the front and rear of the enclosure 10e. Different aperture patterns for the window access to underlying components may be provided (not shown).

FIG. 9 is a side view of the outer sleeve 30 and shows the folded, in-use configuration 30f of the planar sheet 30p (without the skeleton tower assembly 20).

Figure 10:
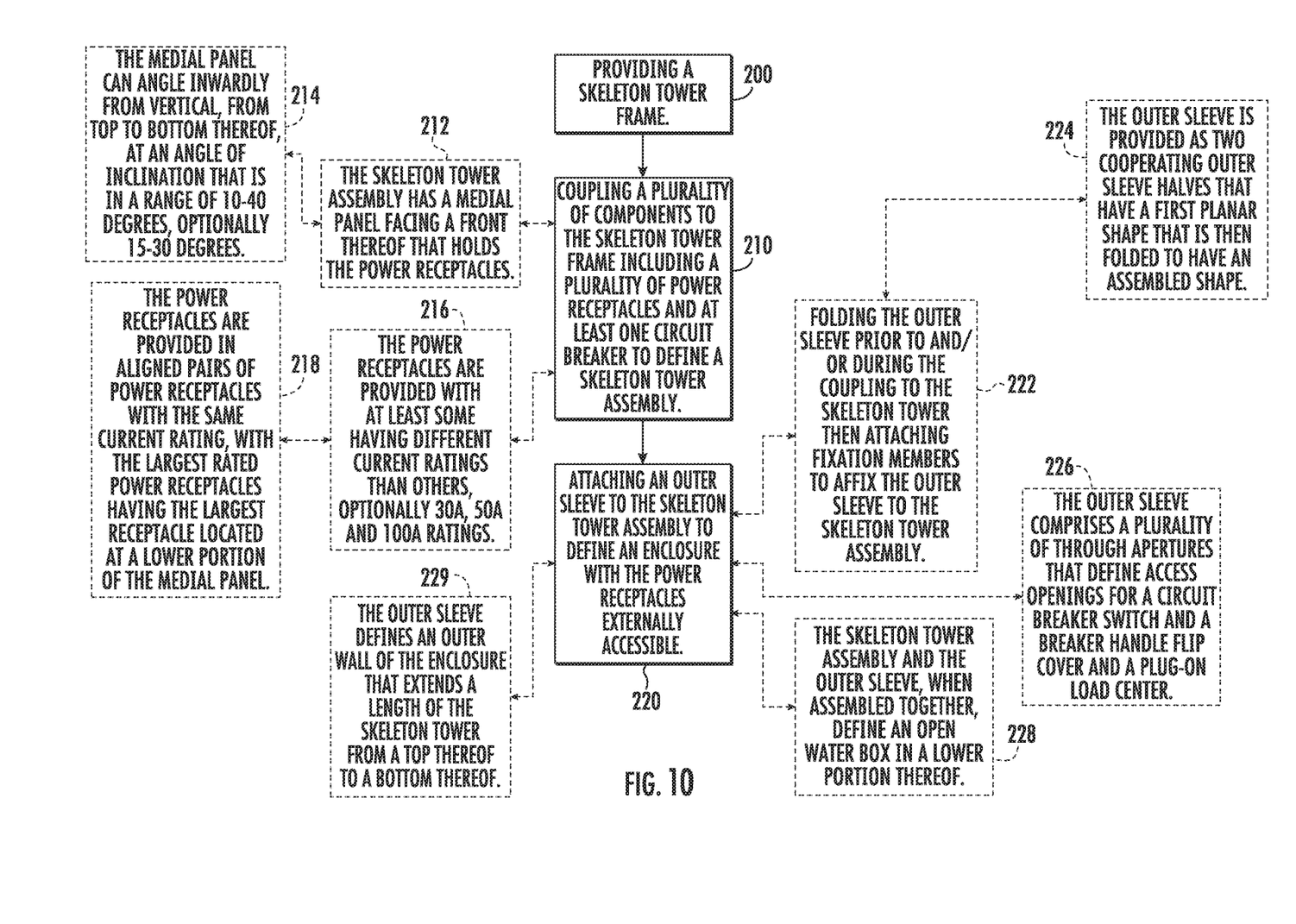
FIG. 10 is a flow chart of example actions that can be used to provide a power pedestal according to embodiments of the present invention.

FIG. 10 is a flow chart illustrating actions for assembling a power pedestal according to embodiments of the present invention. A skeleton tower frame is provided (block 200). A plurality of electronic components are coupled to the skeleton tower frame including a plurality of power receptacles and at least one circuit breaker to define a skeleton tower assembly (block 210). An outer sleeve is attached to the skeleton tower assembly to define an enclosure with the power receptacles externally accessible (block 220).

The skeleton tower assembly has a medially located panel facing a front thereof that holds the power receptacles (block 212).

The medial panel can angle inwardly from vertical, from top to bottom thereof, at an angle of inclination that is in a range of 10-40 degrees, optionally 10-30 or 15-30 degrees (block 214).

The power receptacles are provided with at least some having different current ratings than others, optionally 30 A, 50 A and 100 A ratings (block 216).

The power receptacles are provided in aligned pairs of power receptacles with the same current rating, with the largest rated power receptacles having the largest receptacle located at a lower portion of the medial panel (block 218).

The outer sleeve defines an outer wall of the enclosure that extends a length of the skeleton tower from a top thereof to a bottom thereof (block 229).

The outer sleeve can be folded prior to and/or during the coupling to the skeleton tower then attaching fixation members to affix the outer sleeve to the skeleton tower assembly (block 222).

The outer sleeve can be provided as two cooperating outer sleeve halves that each have a first planar shape that is then folded to have an assembled shape (block 224).

The outer sleeve comprises a plurality of through apertures that define access openings for a circuit breaker switch and a breaker handle flip cover and a plug-on load center (block 226).

The skeleton tower and the outer sleeve, when assembled together, define an open water box in a lower portion thereof (block 228).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A power pedestal, comprising:
   a skeleton tower assembly comprising a skeleton tower frame coupled to a first wall panel, the first wall panel having a plurality of power receptacles that face outward from the first wall panel; and
   an outer sleeve coupled to the skeleton tower frame,
   wherein the outer sleeve comprises a plurality of spaced apart, parallel and vertically oriented fold lines that border at least one outer wall segment of the outer sleeve.

2. The power pedestal of claim 1, wherein at least one pair of the parallel and vertically oriented fold lines define a first outer wall segment that is planar and adjacent to a back of the power pedestal.

3. The power, pedestal of claim 1, wherein the power pedestal has a substantially triangular shape with three primary sides, the three primary sides include two opposing sidewalls and a back, wall, at least the sidewalls having a substantially common length, and wherein a first outer wall segment is defined by a pair of the parallel and vertically oriented fold lines of the outer sleeve and resides between a respective one of the two opposing sidewalls and the back wall and has a length that is in a range of about 10-30% that of the two opposing sidewalls.

4. The power pedestal of claim 1, further comprising:
   a second wall panel coupled to the skeleton tower frame that resides below the first wall panel that angles downward as it extends forward toward a front of the power pedestal; and
   a third wall panel coupled to the skeleton tower frame that is vertically oriented and resides under the second wall panel,
   wherein the power pedestal further comprises a breaker handle cover and a circuit breaker coupled to the skeleton tower frame, wherein the outer sleeve comprises apertures that define access windows for the breaker handle and cover and a switch of the circuit breaker.

5. The power pedestal of claim 1, wherein the outer sleeve and skeleton tower assembly define an enclosure, wherein the outer, sleeve provides a front wall segment of an upper portion of the enclosure and the skeleton tower assembly provides a front wall segment of a lower, portion of the enclosure, wherein the first wall panel with the plurality of power receptacles resides between the front wall segments of the upper and lower portions of the enclosure, and wherein the front wall segment of the lower portion of the enclosure has a greater height than the front wall segment of the upper portion of the enclosure.

6. The power pedestal of claim 5, wherein the front wall segment of the upper portion of the enclosure is vertically spaced apart from and aligned with the front wall segment of the lower portion of the enclosure, and wherein each of the front wall segments are planar.

7. The power pedestal of claim 1, wherein the outer sleeve is provided by a cooperating pair of foldable planar sheets of outer sleeve material that are each coupled to the skeleton tower frame, and wherein a front wall segment of the upper portion of the enclosure is defined by adjacent or abutting edges of the foldable planar sheets.

8. The power pedestal of claim 1, wherein the outer sleeve is provided by a single unitary body of a foldable planar sheet of outer sleeve material that is coupled to the skeleton tower frame, and wherein a front wall segment of an upper portion of the power pedestal is defined by adjacent or abutting edges of the foldable planar sheet.

9. The power pedestal of claim 1, wherein the first wall panel comprises a flange on a perimeter thereof, and wherein a segment of the outer sleeve couples to the flange.

10. The power pedestal of claim 1, further comprising:
    a load center held by the skeleton tower frame inside the outer sleeve and above the first wall panel; and
    a circuit breaker held by the skeleton tower frame inside the outer sleeve.

11. The power pedestal of claim 1, wherein the skeleton tower frame comprises a base with a perimeter that defines upwardly extending back legs, wherein the base attaches to a front lower panel of the power pedestal and an interior panel of the power pedestal, wherein a water box is provided between the front lower panel and the interior panel, and wherein the outer sleeve comprises apertures that receive fixation members that couple the outer sleeve to the upwardly extending back legs of the skeleton tower frame.

12. The power pedestal of claim 1, wherein the outer sleeve comprises an access window in a first wall segment that resides over a breaker held by the skeleton tower frame, wherein the breaker resides under the first wall segment of the outer sleeve, wherein the first wall segment is a minor wall segment that resides between a back wall and a first sidewall, and wherein the first wall, segment has a length that is less than the first sidewall.

13. The power pedestal of claim 1, further comprising a top cover attached to the skeleton tower frame, and wherein the top cover has a substantially triangular shape.

14. The power pedestal of claim 1, further comprising a breaker handle flip cover held by the skeleton tower frame and extending through an aperture in the outer sleeve.

15. The power pedestal of claim 1, wherein the outer sleeve terminates adjacent an outer perimeter portion of the first wall panel with the power receptacles, and wherein the power pedestal further comprises a second wall panel that resides under the first wall panel and tapers down in a direction toward a front of the enclosure away from the first wall panel.

16. The power pedestal of claim 1, further comprising a light source coupled to the skeleton tower frame above the first wall panel that is configured to illuminate downward toward the power receptacles.

17. A power pedestal, comprising:
a skeleton tower assembly comprising a skeleton tower frame that supports a first wall panel, the first panel comprising a plurality of power receptacles; and
an outer sleeve coupled to the skeleton tower frame,
wherein the outer sleeve terminates adjacent the first wall panel with the plurality of power receptacles facing outward and externally accessible, and
wherein the first wall panel resides at an angle from vertical that is in a range of about 10 and about 30 degrees.

18. A method of assembling a power pedestal, comprising:
providing a skeleton tower frame with a base having upwardly extending spaced apart rear legs;
coupling power receptacles, a circuit breaker and a load center to the skeleton power frame; and
attaching an outer sleeve to the skeleton tower frame to define an enclosure that encloses the circuit breaker, and the load center, and exposes the power receptacles,
wherein the method further comprises, before the attaching the outer sleeve, folding at least one foldable planar sheet of outer sleeve material to define a plurality of spaced apart fold lines to form a plurality of planar external wall segments of the outer sleeve.

19. The method of claim 18, wherein the outer sleeve is folded from the planar sheet to define three primary sides including a back wall and first and second opposing sidewalls of the enclosure, wherein the three primary sides have a substantially common length and height, and wherein the outer sleeve comprises apertures that expose a breaker handle cover and a switch of the circuit breaker.

20. The method of claim 19, wherein the outer sleeve is selected from first and second outer sleeves of different materials and a common size and shape.

21. The method of claim 18, wherein the at least one foldable planar sheet of outer sleeve material is a cooperating pair of foldable planar sheets, the cooperating pair of foldable planar sheets are folded then coupled to the skeleton tower, frame and coupled to at least a first wall panel held by the skeletal tower frame, the first wall panel comprising the power receptacles that face outward from the first wall panel to be externally accessible, and a respective one of power receptacle covers coupled to each of the power receptacles.

* * * * *

UNITED STATES PATENT AND TRADEMARK OFFICE
CERTIFICATE OF CORRECTION

PATENT NO. : 10,483,726 B1  
APPLICATION NO. : 16/299760  
DATED : November 19, 2019  
INVENTOR(S) : Seff et al.

Page 1 of 2

It is certified that error appears in the above-identified patent and that said Letters Patent is hereby corrected as shown below:

On the Title Page

Item (71) Applicant, Address:  
Please correct "Dublin (IE)" to read -- Dublin 4 (IE) --

Item (73) Assignee, Address:  
Please correct "Dublin (IE)" to read -- Dublin 4 (IE) --

In the Specification

Column 1, Line 45:  
Please correct "that, resides" to read -- that resides --

Column 6, Line 9:  
Please correct "wall," to read -- wall --

Column 7, Line 32:  
Please correct "and with the back" to read -- and the back --

Column 7, Line 40:  
Please correct "bottom, portion" to read -- bottom portion --

Column 7, Line 41:  
Please correct "ran" to read -- can --

Column 8, Line 15:  
Please correct "panel 21," to read -- panel 21 --

Signed and Sealed this  
Third Day of March, 2020

Andrei Iancu  
*Director of the United States Patent and Trademark Office*

CERTIFICATE OF CORRECTION (continued)
U.S. Pat. No. 10,483,726 B1

In the Claims

Column 9, Line 66, Claim 3:
Please correct "power, pedestal" to read -- power pedestal --

Column 10, Line 2, Claim 3:
Please correct "back, wall," to read -- back wall, --

Column 10, Line 21, Claim 4:
Please correct "handle and cover" to read -- handle cover --

Column 10, Line 25, Claim 5:
Please correct "outer, sleeve" to read -- outer sleeve --

Column 10, Line 27, Claim 5:
Please correct "lower, portion" to read -- lower portion --

Column 11, Line 7, Claim 12:
Please correct "wall, segment" to read -- wall segment --

Column 11, Line 28, Claim 17:
Please correct "the first panel" to read -- the first wall panel --

Column 12, Line 8, Claim 18:
Please correct "the circuit breaker," to read -- the circuit breaker --

Column 12, Line 29, Claim 21:
Please correct "tower, frame" to read -- tower frame --